J. MAXWELL.
Burial-Casket.

No. 208,023. Patented Sept. 17, 1878.

Attest:
J. Chase
Jacob Spahr

Inventor.
John Maxwell
pr R. T. Osgood,
Atty.

UNITED STATES PATENT OFFICE.

JOHN MAXWELL, OF ROCHESTER, NEW YORK.

IMPROVEMENT IN BURIAL-CASKETS.

Specification forming part of Letters Patent No. 208,023, dated September 17, 1878; application filed March 7, 1878.

*To all whom it may concern:*

Be it known that I, JOHN MAXWELL, of the city of Rochester, county of Monroe and State of New York, have invented a certain new and useful Improvement in Burial-Caskets; and I do hereby declare that the following is a full, clear, and exact description of the same, reference being had to the accompanying drawings, in which—

Figure 1:
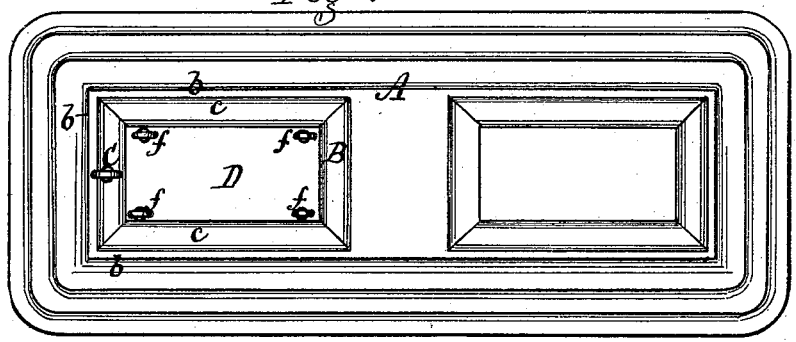
Figure 2:
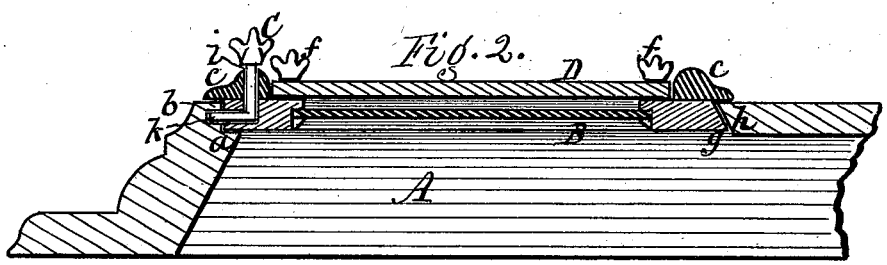
Figure 3:
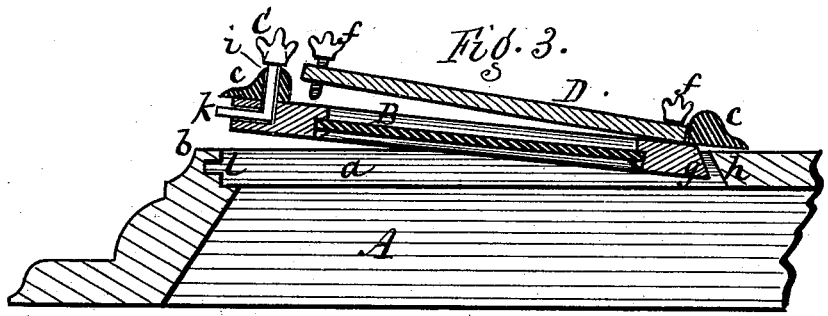
Figure 4:
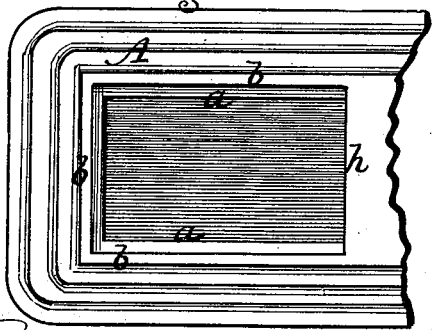

Figure 1 is a plan of the lid of the casket. Fig. 2 is a vertical section of the same on an enlarged scale. Fig. 3 is a similar view, showing the glass frame and its covering-plate elevated at one end. Fig. 4 is a plan similar to Fig. 1, but showing the glass frame and covering-plate removed from place, and exhibiting the seat in which the glass frame rests.

This invention involves the same general plan described in my patent of July 10, 1877, viz: the combination of a glass frame and covering-plate, having locking devices at their ends, and so arranged that they may be removed separately or together, thereby avoiding the necessity of first removing the covering-plate before the glass frame can be removed, as in ordinary burial-caskets.

The design of the present invention is to simplify the construction and avoid the objection of cutting away or removing the whole end of the top plate of the lid and the fitting therein of the glass frame and covering-plate, by which the end of said glass frame and covering-plate project outward, and the whole surface is exposed as in my aforesaid Letters Patent, and substitute in place thereof a glass frame and covering-plate which fit within a seat of the lid, which is inclosed on all sides, said glass frame and covering-plate thus forming, as it were, a panel, leaving the molding of the top of the lid extending around on all sides. To accomplish this the glass frame is made a complete square, having a top molding, and the covering-plate is simply placed within the molding and secured by screws, and the glass frame only is provided with the devices by which the attachment is made to the lid, thus saving the duplication of such devices as shown in my aforesaid Letters Patent.

In the drawing, A represents the lid of the casket. B is the glass frame, and D is the covering-plate. The glass frame rests within a seat, $a$, of the coffin-lid, which is inclosed on all sides, the molding $b$ of the top of the lid extending all the way around. This is shown more particularly in Fig. 4. The top of the glass frame has a molding, $c$, which serves a double purpose: first, it projects over and rests on top of the seat of the lid and prevents the glass frame from falling through; and, second, it has square shoulders on the inside, which form the seat to center and hold the covering-plate. The covering-plate is simply placed within the molding resting on the glass frame, and it is secured to the glass frame by four ornamental screws, $f\,f\,f\,f$, which pass down into the wood of the frame outside the glass.

The rear or inner end of the glass frame is provided with a bevel-edge, $g$, which fits under a corresponding bevel, $h$, of the lid; or, instead of this, dowels may be employed, or other suitable catches which strike under the cross-piece of the lid. The front or outer end of the glass frame has a key or catch, C, consisting of a vertical shaft, $i$, with an ornamental head, which shaft passes down through the molding $c$, and a bit or arm, $k$, which turns horizontally into a slot, $l$, in the seat of the lid. When so connected the glass frame and its covering-plate are securely fastened, and in removing them they can either be removed together, as one fixture, or separately, as may be desired, in which respect they accomplish the same general result as in my before-mentioned patent.

The special advantage of the construction before described is that the glass plate and its covering-plate form a panel, which fits in an inclosed seat of the coffin-lid, whereas in my aforesaid patent the seat is open, and the glass frame and covering-plate are exposed their whole length. A better appearance is presented by thus inclosing and sinking the parts, and the top molding of the lid is unbroken all the way around, and greater strength is secured, as the strain does not come on the fastenings. A single set of fastenings is used instead of a double set, thus reducing the cost and rendering the device simple in operation.

I do not claim in this application, broadly, a combined glass frame and covering-plate, arranged so that both can be removed together or either separately; but

I claim—

In a burial-casket, the combined glass frame B and covering-plate D, resting in an inclosed seat of the casket-lid, the frame being provided with the molding $c$, resting upon the seat and inclosing the covering-plate, and said covering-plate being attached to the frame by screws, the whole arranged, as described, so that a single set of locking devices, consisting of the bevel $g$, or equivalent dowels, and the turning-key C, serve to secure the frame to the lid, as shown and described, and for the purpose specified.

In witness whereof I have hereunto signed my name in the presence of two subscribing witnesses.

JOHN MAXWELL.

Witnesses:
   R. F. OSGOOD,
   W. L. PALMER.